United States Patent Office 3,707,460
Patented Dec. 26, 1972

3,707,460
NAPHTHA HYDROFORMING PROCESS
Ralph J. Bertolacini, Chesterton, and Richard D. Petersen, Valparaiso, Ind., assignors to Standard Oil Company, Chicago, Ill.
No Drawing. Continuation-in-part of application Ser. No. 858,119, Sept. 15, 1969, which is a continuation-in-part of abandoned application Ser. No. 788,671, Nov. 7, 1968, which in turn is a continuation-in-part of abandoned application Ser. No. 512,268, Dec. 6, 1965. This application Mar. 19, 1971, Ser. No. 126,366
Int. Cl. C10g 35/08, 39/00
U.S. Cl. 208—65
33 Claims

ABSTRACT OF THE DISCLOSURE

The process comprises contacting naphtha and hydrogen with a first catalyst under hydroforming conditions and finally with a second catalyst under hydroforming conditions. The first catalyst comprises a Group VIII metal, a halide, and alumina. The second catalyst comprises a Group VIII metal, mordenite, and alumina. The second catalyst may be characterized further by 0.1 to 1.2 wt. percent chloride.

CROSS-REFERENCE TO RELATED APPLICATIONS

This application is a continuation-in-part application of co-pending application Ser. No. 858,119, which was filed on Sept. 15, 1969, and is now abandoned, and which was a continuation-in-part application of application Ser. No. 788,671, which was filed on Nov. 7, 1968, and is now abandoned. Ser. No. 788,671 was, in turn, a continuation application of Ser. No. 512,268, which was filed on Dec. 6, 1965, and is now abandoned.

BACKGROUND OF THE INVENTION

The present invention relates to hydrocarbon conversion processes and, more particularly, to naphtha hydroforming processes utilizing two catalysts, both of which contain a Group VIII metal and one of which contains a particular form of zeolite.

Platinum-alumina-halogen catalysts are in successful commercial use in the conversion of low-octane petroleum naphthas under hydroforming conditions into gasolines of high anti-knock rating. In a typical platinum-hydroforming process, a mixture of charging stock which has been treated to remove sulfur and nitrogen compounds and hydrogen-containing gas is passed through a bed of platinum-alumina-halogen catalyst containing between about 0.05 to 1% by weight each of platinum and a halogen, usually chlorine. The hydroforming reactions are carried out at a temperature in the range of about 800° to 1,000° F., a total pressure between about 100 and 1,200 pounds per square inch gauge, a hydrogen partial pressure between about 50 and 1,000 pounds per square inch, a hydrogen rate of 2,000 to 10,000 standard cubic feet per barrel of charging stock, and a weight hourly space velocity between about 0.5 and 10 pounds of hydrocarbon per hour per pound of catalyst. Various techniques of halogen addition are used to replace halogen lost from the catalyst during processing.

Among the patents that were cited by the examiner during the prosecution of the above-mentioned related applications were U.S. Pat. 3,114,696, issued to Weisz; U.S. Pat. 3,301,917, issued to Wise; and U.S. Pat. 3,140,253, issued to Plank and Rosinski.

The Weisz patent is directed to a two-stage process for upgrading naphthas wherein a hydrocarbon mixture is reformed in a first stage under reforming conditions and the reformate resulting from this first stage, or a portion thereof, is catalytically cracked in the presence of a zeolitic catalyst under catalytic cracking conditions in a second stage. The catalyst in the first stage is a platinum-halogen-alumina catalyst. The catalyst in the second stage comprises a solid crystalline aluminosilicate zeolite having uniform pore dimensions of about 5 angstrom units (A.). In column 6, at lines 63, 73, of the Weisz patent, it is stated that a crystalline zeolite may be composited with one or more materials which may act as promoters or activators. Alumina may be such a material.

The Wise patent is directed to upgrading of paraffinic hydrocarbons by isomerization and/or hydrocracking in the presence of mixed aluminosilicate platinum-metal catalyst. This catalyst comprises platinum supported on a thermally-stable carrier physically mixed with an aluminosilicate, such as mordenite.

The Plank, et al., patent is directed to catalysts comprising aluminosilicate material containing both hydrogen ions or ions capable of conversion to hydrogen ions and rare earth metal cations either alone or admixed with a porous matrix, which may be a refractory oxide or an inorganic oxide gel. The aluminosilicate material may be mordenite and the catalyst may be suitable for hydrocarbon conversion processes, such as gas oil cracking, reforming, hydrocracking, isomerization, and hydrogenation.

It is believed that the improved hydroforming process of the present invention is patentable over each of these patents. None teaches, discloses, or suggests a two-catalyst process for upgrading a naphtha wherein both catalysts of the process are used with hydroforming conditions. There is no suggestion in the Weisz patent that a hydrogenating component is supported on the zeolite-containing second catalyst. Nor is there a suggestion that reforming conditions are employed with the second catalyst. On the contrary, the Weisz patent teaches and claims that the second catalyst is employed under catalytic cracking conditions. Furthermore, neither the Wise patent nor the Plank, et al., patent teaches, discloses, or suggests a two-catalyst reforming process wherein a Group VIII-metal-halide-alumina catalyst is employed as the first catalyst and a Group VIII-metal-mordenite-alumina catalyst is employed as the second catalyst, both catalysts being used under hydroforming conditions. In fact, the Wise patent considers temperatures which do not exceed 700° F. and treats paraffinic hydrocarbons, not a naphtha. If the process of the Wise patent were to be employed as the second-stage of the process taught and disclosed in the Weisz patent, the resulting product from the two-catalyst process would be quite inferior to that of the two-catalyst process of the present invention, as will be shown hereinafter in Example II. The present invention is patentable over combinations of these patents.

The activity and selectivity of hydrocarbon conversion catalysts depend upon a variety of factors, such as the identity and condition of the catalyst components, the mode of catalyst preparation, the presence or absence of promoters and modifiers, the presence or absence of contaminating materials in the charging stock and the proportion thereof, the conversion temperature, the hydrogen partial pressure in the conversion zone, and the like. The commercial catalysts are prepared by commingling a Group VIII metal compound (Group VIII in the Periodic Table of the Elements) with a hydrous adsorbent refractory inorganic oxide, such as alumina, and thereafter drying and calcining. A new hydroforming process has now been discovered, a preferred embodiment of which utilizes a catalyst comprising platinum, chloride, and alumina and a catalyst comprising platinum, mordenite, and alumina in a manner which produces an aromatic product of higher octane and yield than is obtained from the use of either catalyst alone.

SUMMARY OF THE INVENTION

According to the present invention, there is provided an improved hydroforming process, which process comprises contacting hydrodesulfurized hydroforming feed naphtha boiling generally in the ASTM boiling range of 150° to 400° F. under hydroforming conditions first with a first catalyst comprising a Group VIII metal, a halide, and alumina and finally with a second catalyst comprising a Group VIII metal, mordenite structure zeolite, and alumina. In one embodiment, the second catalyst comprises 0.01 to 10 wt. percent Group VIII metal, 0.1 to 25 wt. percent mordenite, and 75 to 99.9 wt. percent alumina. The support for this second catalyst contains preferably about 0.5 to 5 wt. percent mordenite. Group VIII metals which are particularly useful in both the first catalyst and the second catalyst are Group VIII noble metals, advantageously, platinum and palladium. Platinum is the preferred Group VIII metal.

In another aspect, the invention provides an improved naphtha hydroforming process which comprises contacting the naphtha in admixture with hydrogen under hydroforming conditions with a first catalyst consisting essentially of 0.1 to 1.2 wt. percent platinum and 0.1 to 1.2 wt. percent chloride on alumina and then with a second catalyst consisting essentially of 0.01 to 10 wt. percent of Group VIII metal on a support containing 0.1 to 15 wt. percent mordenite zeolite and 85 to 99.9 wt. percent alumina. The mordenite zeolite may be in a form selected from the class consisting of the unexchanged cation form and ion exchanged form containing at least one of the following cations: cations of Group I metals, cations of Group II metals, cations of Group III metals, ammonium ions, hydrogen ions. Preferably, the mordenite is essentially completely in the hydrogen form.

DESCRIPTION OF THE INVENTION

The process of this invention is especially advantageous in the hydroforming of petroleum naphthas boiling in the range of about 150° to 400° F. and is capable of upgrading a 50% naphthenic naphtha having a research octane number of only 40 to 50 into a $C_5^+$-gasoline having a research octane number of 90 to 100 in a yield of 65 to 90%. Still higher $C_5^+$-octane rating reformate may be produced at somewhat reduced yield as the octane is increased above 100.

The reforming or hydroforming of various hydrocarbon fractions simultaneously effects a group of reactions, including the production of 6-membered ring naphthenes from other naphthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of carbon and of the unsaturated fragments, and various side reactions. All of these reactions tends to produce products containing motor-fuel fractions of improved anti-knocking rating.

In order to better understand the present invention, the naphtha hydroforming process of the present invention may be thought of as a three-stage process in which dehydrogenation of naphthenes to form the corresponding aromatic compounds is the principal first-stage reaction, the second stage reactions are predominantly ring isomerization of naphthenes, such as alkylcyclopentanes, to six-membered ring naphthenes and subsequent dehydrogenation to form aromatics and the dehydrocyclization of paraffins to form aromatics, the third and final stage is almost exclusively cracking of remaining low octane $C_6^+$-paraffins to lower-boiling compounds with some dehydrocyclization also taking place. The third-stage catalyst, which may be a platinum-mordenite-alumina catalyst, is different from the first and second stage catalyst, which may be a platinum-alumina-chloride catalyst and which may be employed in a separate reactor, as a layer in a fixed-bed reactor also containing the platinum-alumina-chloride catalyst, or may be admixed with platinum-alumina-chloride catalyst in a final or last reactor.

The $C_7^+$-reformate from the process of the present invention normally contains at least about 95 vol. percent aromatics and at the higher severities may contain 98+ percent aromatic. Thus the product from the process of this invention may readily be separated into fractions of easily purified aromatic compounds for use as chemical raw materials or the total reformate or fractions thereof may be used as high octane gasoline blending components.

Optionally, the second stage hydrocarbon effluent may be fractionated and only the $C_6^+$- or $C_7^+$-fraction then combined with hydrogen and passed into contact under hydroforming conditions of temperature and pressure with the third-stage catalyst at a space velocity in the range of about 3 to 25 wo./hr./wc.

In utilizing the new process of this invention for the continuous reforming of hydrocarbons, a feedstock consisting essentially of a virgin naphtha, a cracked naphtha, or a mixture thereof, boiling within the range of about 70 to about 500° F., and preferably within the range of about 180° to 400° F. is contacted in the vapor phase with the catalysts at a temperature within the range of about 800° to 1,050° F., the average temperature throughout the catalyst being maintained within the range of about 875° to 950° F., preferably around 900° F. The average temperature of the first stage is lowest because of the endothermic nature of the reactions which take place therein, the second-stage temperature is intermediate, and the average temperature of the third stage is highest, there often being a slight rise in temperature through the third-stage catalyst. The process is operated generally at a pressure within the range of about 200 to 1,000 pounds per square inch, preferably from about 200 to 400 pounds per square inch. However, it may be operated at as low a pressure as 50 pounds per square inch. Hydrogen is included within the reaction zone, ordinarily by recycle, in the range of about 2 to 8 moles of hydrogen per mole of feed, preferably, between about 3 and 6 moles per mole. It is preferred to adjust the composition of the catalysts and to adjust the operating conditions so that there is at least a small net production of hydrogen, the introduction of hydrogen from an outside source being thereby rendered unnecessary. This can conveniently be effected for a given catalyst composition by adjusting the proportion of naphthenes in the charging stock to produce at least enough hydrogen to saturate the materials produced by the paraffin-cracking reactions and to provide for the normal venting requirements.

The new process can be carried out in any of the conventional types of equipment known to the art. One may, for example, employ catalysts in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, the catalysts may be in a suitable form for use in moving beds, in which the charging stock and catalyst are preferably passed in countercurrent flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The preferred process is exemplified by Ultraforming (Petroleum Engineer, vol. XXVI, No. 4, April 1954, at p. C–35). In a six-reactor unit with five reactors on oil and one reactor under regeneration, it is convenient to employ the mordenite-containing catalyst in the last reactor and a mixture (or layers) of the two catalysts in the swing reactor. The reaction products from any of the foregoing processes are separated from the catalyst and fractionated to recover the various components thereof. The hydrogen and unconverted materials are recycled as desired, the excess hydrogen produced in the reformer convenientlly utilized in the hydrodesulfurization of the feed.

The first catalyst for the process of this invention may be any of such reforming catalysts known in the art. A preferred embodiment of this first catalyst comprises a Group VIII metal, a halide, and a catalytically active alumina. Particularly useful Group VIII metals are the noble metals, platinum being the preferred Group VIII metal. A preferred halide is chloride. It is contemplated that the first catalyst for the process of the present invention may be characterized further by one or more catalytic metals or promoters, such as rhenium, molybdenum, tungsten, and compounds thereof.

The second catalyst, or final catalyst, for the process of the present invention comprises a Group VIII metal, mordenite structure zeolite, and catalytically active alumina. The preferred Group VIII metals are the noble metals, particularly, platinum. This second catalyst may be characterized further by one or more catalytic metals or promoters, such as rhenium, molybdenum, tungsten, and compounds thereof. The second catalyst may also contain a halide, such as chloride, provided it does not exhibit undesirable physical or chemical effects on the catalyst, or the process employing the catalyst. Usually the halide is present in an amount that is less than about 1.0 weight percent based on the weight of the catalyst.

The zeolite employed in the second catalyst, or the third-stage catalyst, of this invention is the particular form of zeolite known as mordenite. While mordenite is naturally occurring, a synthetic mordenite known as Zeolon has become available commercially from the Norton Company. Zeolon-H is the hydrogen form of this synthetic mordenite. Mordenite is characterized by its high silicon-to-aluminum ratio of about 5:1 and its crystal structure. Composition of mordenite as given in Kirk-Othmer, "Encyclopedia of Chemical Technology," vol. 12, p. 297, is $(Ca, Na_2)Al_2Si_9O_{22}6H_2O$. The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages, whereas the mordenite has parallel channels of uniform diameter. For example, synthetic faujasite, which has the formula $Na_3Al_3Si_4O_{14}$, is characterized by a 3-dimensional array of pores which consist of 12–13 A. cages interconnected through 8–9 A. windows.

The mordenite zeolite in the catalyst employed in the process of the present invention may be in the unexchanged cation form containing exchangeable sodium and/or calcium ions or, other alkali metal, alkaline earth metal, or preferably the alkali metal cations may be replaced with hydrogen ions, such as by exchanging the alkali metal ions with ammonium ions and then heating to drive off ammonia leaving the mordenite in the hydrogen form. Mordenite differs from other zeolites in that substantially all the exchangeable metal cations may be replaced with hydrogen ions without causing destruction of the characteristic crystal structure.

The first catalyst for the process of this invention may be any of such reforming catalysts known in the art. The second catalyst, or third-stage catalyst, or final catalyst, may be prepared by forming an adsorbent refractory cocatalytic support material consisting essentially of about 0.1 wt. percent to about 25 wt. percent mordenite structure zeolite and about 75 wt. percent to about 99.9 wt. percent alumina and incorporating with said support material about 0.01 to about 10 wt. percent of a Group VIII metal or compound thereof. This catalyst composition may be formulated in various ways. For example, finely divided mordenite zeolite may be stirred into alumina sol, a soluble non-halogen Group VIII metal compound, such as, for example $(NH_3)_2Pt(NO_2)_2$, added to the sol, and the sol mixture cogelled by addition of dilute ammonia, and the resulting solid dried and calcined. Another way of preparing the catalyst is by mixing finely divided mordenite zeolite into alumina sol as above, gelling the sol by addition of dilute ammonia to produce a gel which is then dried and pelleted. The pellets are then calcined, cooled, and then impregnated with a Group VIII metal solution. A third method for making the catalyst is to blend an alumina hydrogel and finely divided mordenite zeolite, adding to this blend a solution of the Group VIII metal, and thoroughly blending the mixture. The resulting gel mixture is then dried, pelleted and the pellets calcined. Suitable drying conditions for use in the various catalyst manufacturing methods include a temperature in the range of about 200° to 400° F. for a time in the range of about 5 to 30 hours. Suitable calcination conditions include a temperature in the range of about 900° to 1,500° F. for a time of about 2 to 20 hours. Preferred drying and calcining conditions are a temperature of about 250° F. for about 16 hours and a temperature of about 1,000° F. for about 6 hours, respectively.

EXAMPLE I

To illustrate the advantages of the present invention, operation with platinum-alumina-chloride catalyst followed by platinum-alumina-mordenite catalyst (Test C) is compared with operations utilizing each of the two catalysts alone (Tests A and B). The data are shown in Table I. This comparison clearly shows that operation according to the present invention results in improved yield of high octene gasoline blending stock.

Comparative data are obtained in an automated bench-scale pilot plant. The pilot plant reactor is a one-inch schedule 80 pipe with a 0.132 inch outside-diameter thermowell located concentrically in the reactor. Heated naphtha combined with hydrogen-containing recycle gas is charged to the top of the reactor. Effluent from the reactor is cooled and flashed in a gas-liquid separator maintained at reactor pressure. A portion of the flash gas from the separator is dried and recycled. The remainder of the flash gas is released through a pressure control valve to maintain reactor pressure. Liquid from the separator is charged to a low-pressure stabilizer to produce a stabilized liquid product for analysis. Gas from the stabilizer is combined with separator flash gas for measurement and analysis.

The feedstock is a mid-continent naphtha. This feed contains 10 volume percent aromatics and 38.5 volume percent naphthenes, and has an API gravity of 56.2 and an ASTM boiling range of 188° to 378° F.

Commercial operations are simulated by loading the catalysts into the reactor in beds with reheat between the catalyst beds.

The reaction temperature is controlled by preheating the feed to the first bed to 930° F. and operating the first bed adiabatically.

The process stream is reheated to 950° F. before it reaches the top of the second bed. Heat is added to the middle-third of the second bed to obtain a temperature of 947° F.

Other operating conditions include a space velocity of 3 grams of oil per hour per gram of catalyst (wo./hr./wc.), a reactor pressure of 300 p.s.i.g. and a gas recycle rate of 2,700–2,800 standard cubic feet per barrel (s.c.f.b.).

TABLE I

| Catalyst | Test A | Test B | Test C |
|---|---|---|---|
| | Pt-Al₂O₃-Cl | Pt-Al₂O₃-Mordenite | Pt-Al₂O₃Cl followed by Pt-Al₂O₃-Mordenite |
| Product: | | | |
| C₅⁺-research octane | 96.0 | 102.5 | 98.0 |
| C₅⁺-yield, vol. percent | 81.5 | 63.6 | 78.0 |
| Composition, vol. percent: | | | |
| Paraffins | 33.6 | 23.5 | 31.5 |
| Naphthenes | 2.7 | 2.4 | 2.0 |
| Aromatics | 63.7 | 74.1 | 66.1 |
| C₆ thru C₉ paraffins | 26.1 | 9.9 | 14.5 |

The catalyst of Test B operated under less severe conditions to give the same octane product as Test C results in a yield of only 71.5 vol. percent as compared with the 78.0 vol. percent yield at 98 octane with Test C catalysts and conditions. Also the Test C product contains significantly more aromatics and less paraffin hydrocarbons than Test A, even when adjusted to the same octane.

EXAMPLE II

A catalyst was commercially prepared by the American Cyanamid Company as 1/12-inch extrudates. This catalyst was purchased under the American Cyanamid Company No. WI-868 and is believed to have the following composition: 0.74 wt. percent platinum, 0.82 wt. percent chloride, about 2.0 wt. percent Zeolon-H (based upon the silica content), and 0.28 wt. percent sodium (the remainder of the catalyst being gamma-alumina).

A 100-gram sample of the above identified catalyst was charged to the reactor of a bench-scale test unit similar to that described in Example I and was tested under the following conditions: a pressure of 200 p.s.i.g., an inlet temperature of 970° F., a weight hourly space velocity of about 3, a recycle gas rate of about 4,000 standard cubic feet of gas per barrel of hydrocarbon, and the addition of hydrogen to maintain about 70–80 volume percent of hydrogen in the recycle gas. The test unit was operated adiabatically. The hydrocarbon feedstock that was charged to the reactor was a commercially prepared reformate that contained 2.8 volume percent naphthenes and 64.1 volume percent aromatics. This reformate had an unleaded research octane number of 97.8 and had been reformed over a catalyst comprising platinum and chloride on an alumina base. This particular reformate was used to simulate the feedstock to the tail reactor of a process for high severity hydroforming pursuant to the present invention.

The effluent from the reactor was separated into a liquid product and a gas, which gas was recycled. The liquid product was subsequently stabilized to contain essentially C₅ and heavier hydrocarbons. This stabilized liquid product was analyzed for naphthene and aromatic concentrations and its unleaded research octane number (CFR-R). The results of this test are shown in Table II. This test represented an embodiment of the process of the present invention.

TABLE II

| Period No. | Time, hrs. | CFR-R | Concentration in product Naphthenes, vol. percent | Concentration in product Aromatics, vol. percent | Yield of aromatics on feeds, vol. percent |
|---|---|---|---|---|---|
| 1 | 2 | 102.4 | 2.4 | 74.8 | |
| 2 | 4 | | 2.6 | 73.5 | 65.4 |
| 3 | 6 | 101.4 | 2.8 | 71.2 | 63.9 |
| 4 | 6 | | 2.9 | 71.6 | 64.4 |
| 5 | 6 | 101.1 | 3.0 | 71.0 | |

A 100-gram sample of the above-identified catalyst was tested in a test unit as described above. However, the test conditions were maintained to simulate the operating conditions suggested in U.S. Pat. 3,301,917. The inlet temperature was maintained at 500° F.; the other conditions were the same as those employed above and the unit was operated adiabatically. It was noted that the temperature increased to at least about 650° F. as a profile along the length of the bed was obtained. The stabilized liquid products from this test were analyzed for their naphthene and aromatic contents and their unleaded research octane number (CFR-R). The results of this test are presented in Table III.

TABLE III

| Period No. | Time, hrs. | CFR-R | Concentration in product Naphthenes, vol. percent | Concentration in product Aromatics, vol. percent | Yield of aromatics on feed, vol. percent |
|---|---|---|---|---|---|
| 1 | 1 | | 46.2 | 13.7 | |
| 2 | 2 | 87.1 | 23.7 | 39.6 | 40.8 |
| 3 | 4 | 90.5 | 20.8 | 49.4 | 49.6 |
| 4 | 6 | 90.8 | | | |
| 5 | 6 | 90.8 | 20.3 | 49.2 | 49.8 |

These results demonstrate that the process of the present invention is greatly superior to a process for upgrading petroleum hydrocarbons wherein reforming over a platinum-alumina-chloride catalyst under reforming conditions is followed by contacting the effluent from the reforming with a platinum-mordenite-alumina catalyst at a temperature that does not exceed 700° F. Surprisingly, the aromatics yield is much greater than that obtained at the operating conditions disclosed in the U.S. Pat. 3,301,917. Aromatics are hydrogenated to naphthenes in the latter operation.

EXAMPLE III

A special test was made in a commercial reforming unit. This unit consisted of 4 reactors on stream and a swing reactor which could be placed in any position in the unit. Each reactor contained about the same amount of reforming catalyst, the difference between the lightest catalyst loading and the heaviest catalyst loading being less than 1 wt. percent. Four of the reactors were charged with ordinary platinum-alumina-chloride reforming catalyst, while the fifth was loaded with a mordenite-containing catalyst. Both catalysts contained the same amount of platinum. The mordenite-containing catalyst contained 2 wt. percent Zeolon-H.

The unit was operated first with the 4 reactors containing the platinum-alumina-chloride catalyst as the only reactors on stream. Then the last reactor (tail reactor) in the system was removed from the system and the reactor loaded with the mordenite-containing catalyst was substituted therefor. The unleaded research octane number of the heavy reformate was maintained at a level of about 111 before and after the reactor substitution. Data obtained from this test are presented in Table IV. A paraffinic naphtha was employed as the feedstock and, in each case, the feed rate was adjusted to provide a 100 percent weight balance. The rates are presented in terms of barrels per day (B/D).

TABLE IV

|  | Catalyst in tail reactor | | | |
| --- | --- | --- | --- | --- |
|  | Pt-Cl-Al$_2$O$_3$ | Mordenite-containing | | |
| Relative day of test | 1 | 2 | 3 | 9 |
| Adjusted feed rate, B/D | 5,798 | 6,984 | 7,343 | 7,680 |
| Feed throughout increase, percent |  | 20 | 27 | 32 |
| Heavy reformate: rate, B/D | 2,557 | 2,808 | 3,209 | 3,264 |
| CFR-R | 111.0 | 111.7 | 111.7 | 110.5 |

The results of this test clearly demonstrate that the reforming system employing the mordenite-containing catalyst in the tail reactor produces the same superior octane number for the heavy reformate even though the naphtha throughput is increased as much as 30 percent over that employed with the conventional catalyst in the tail reactor. These data indicate that the process of the present invention is an improved naphtha hydroforming process.

While this invention has been described in connection with particular embodiments thereof, it is not to be limited thereby. Various modifications and variations of the invention will be apparent to a person possessing ordinary skill in this art from the above description thereof and such are to be deemed within the scope of the invention. The above examples are presented for purposes of illustration only and are not intended to limit the scope of the invention.

What is claimed is:

1. An improved hydroforming process which comprises contacting naphtha hydroforming feed and hydrogen first with a first catalyst under hydroforming conditions and finally with a second catalyst under hydroforming conditions, said first catalyst comprising a Group VIII metal, a halide, and alumina and being a mordenite-free catalyst, and said second catalyst comprising a Group VIII metal, mordenite, and alumina, said hydroforming conditions comprising a temperature within the range of about 800° F. to about 1,050° F., a pressure within the range of about 50 pounds per square inch to about 1,000 pounds per square inch, and a ratio of hydrogen to hydrocarbon feed within the range of about 2 to about 8 moles of hydrogen per mole of feed.

2. The process of claim 1 wherein said Group VIII metal of said first catalyst is a noble metal and said Group VIII metal of said second catalyst is a noble metal.

3. The process of claim 1 wherein said Group VIII metal of said first catalyst is a platinum and said Group VIII metal of said second catalyst is platinum.

4. The process of claim 1 wherein said mordenite is in the hydrogen-exchanged form.

5. The process of claim 1 wherein said Group VIII metal of said first catalyst is platinum, said Group VIII metal of said second catalyst is platinum, and said mordenite is in the hydrogen-exchanged form.

6. The process of claim 1 wherein said Group VIII metal of said first catalyst is platinum, said Group VIII metal of said second catalyst is platinum, said halide is chloride, and said mordenite is in the hydrogen-exchanged form.

7. The process of claim 6 wherein the halide of said first catalyst is chloride.

8. The process of claim 6 wherein said pressure is within the range of about 200 pounds per square inch to about 400 pounds per square inch.

9. The process of claim 6 wherein said second catalyst is employed in a reactor that is separate from any reactor containing said first catalyst.

10. The process of claim 8 wherein said second catalyst is employed in a reactor that is separate from any reactor containing said first catalyst.

11. The process of claim 9 wherein said second catalyst also contains 0.1 to 1.0 wt. percent chloride.

12. An improved hydroforming process which comprises contacting naphtha hydroforming feed and hydrogen first with a first catalyst under hydroforming conditions and finally with a second catalyst under hydroforming conditions, said first catalyst consisting essentially of a platinum-alumina-chloride catalyst and said second catalyst consisting essentially of 0.01 to 10 wt. percent Group VIII metal, 0.1 to 25 wt. percent mordenite, and 75 to 99.9 wt. percent adsorbent alumina, said hydroforming conditions comprising a temperature within the range of about 800° to 1,050° F., a pressure within the range of about 200 to 1,000 pounds per square inch, and a ratio of hydrogen to hydrocarbon feed within the range of about 2 to 8 moles of hydrogen per mole of feed.

13. The improved process of claim 12 wherein said second catalyst is employed in a reactor that is separate from any reactor containing said first catalyst.

14. The improved process of claim 12 wherein said second catalyst is employed in a reactor that contains also said first catalyst.

15. The improved process of claim 12 wherein said second catalyst may be admixed with said first catalyst in a last reactor.

16. The process of claim 12 wherein said Group VIII metal is a noble metal.

17. The process of claim 12 wherein said Group VIII metal is platinum.

18. The process of claim 12 wherein said mordenite is in the hydrogen-exchanged form.

19. The process of claim 12 wherein said Group VIII metal is platinum and said mordenite is in the hydrogen-exchanged form.

20. The process of claim 17 wherein the average temperature is maintained within the range of about 875° to about 950° F.

21. The improved process of claim 19 wherein said second catalyst is employed in a reactor that is separate from any reactor containing said first catalyst.

22. The improved process of claim 19 wherein said second catalyst is employed in a reactor that contains also said first catalyst.

23. The improved process of claim 19 wherein said second catalyst may be admixed with said first catalyst in a last reactor.

24. The process of claim 20 wherein said pressure is within the range of about 200 to about 400 pounds per square inch.

25. In an improved hydroforming process wherein a naphtha is contacted in a hydroforming zone with a catalyst consisting essentially of platinum, alumina, and chloride in the presence of hydrogen under hydroforming conditions, the improvement which comprises contacting the effluent from said hydroforming zone with a second catalyst consisting essentially of 0.01 to 10 wt. percent Group VIII noble metal, 0.1 to 25 wt. percent mordenite, and 75 to 99.9 wt. percent adsorbent alumina under hydroforming conditions comprising a temperature within the range of about 800° to about 1,050° F., a pressure within the range of about 200 to 1,000 pounds per square inch, and a ratio of hydrogen to hydrocarbon feed within the range of about 2 to 8 moles of hydrogen per mole of feed.

26. The process of claim 25 wherein said second catalyst also contains 0.1 to 1.0 wt. percent chloride.

27. The process of claim 25 wherein said pressure is within the range of about 50 pounds per square inch to about 1,000 pounds per square inch.

28. An improved naphtha hydroforming process which comprises contacting naphtha in admixture with hydrogen first with a first catalyst under hydroforming conditions and finally with a second catalyst under hydroforming conditions, said first catalyst consisting essentially of 0.1 to 1.2 wt. percent platinum, 0.1 to 1.2 wt. percent chloride and alumina and said second catalyst consisting essentially of 0.1 to 1.2 wt. percent platinum group metal on a support containing 0.1 to 15 wt. percent mordenite and 85 to 99.9 wt. percent alumina, said hydroforming conditions comprising a temperature within the range of about 800° to 1,050° F., a pressure within the range of about 200 to 1,000 pounds per square inch, and a ratio of hydrogen to hydrocarbon feed within the range of about 2 to 8 moles of hydrogen per mole of feed.

29. The process of claim 28 wherein said mordenite is the hydrogen-form of mordenite.

30. The process of claim 28 wherein said second catalyst also contains 0.1 to 1.2 wt. percent chloride.

31. The process of claim 29 wherein said second catalyst also contains 0.1 to 1.2 wt. percent chloride.

32. The process of claim 30 wherein said pressure is within the range of about 200 to 400 pounds per square inch.

33. The process of claim 32 wherein the average temperature is maintained within the range of about 875° to 950° F.

References Cited

UNITED STATES PATENTS

| | | | |
|---|---|---|---|
| 3,114,696 | 12/1963 | Weisz | 208—66 |
| 3,124,523 | 3/1964 | Scott | 208—62 |
| 2,937,132 | 5/1960 | Voorhies | 208—64 |
| 3,267,023 | 8/1966 | Miale et al. | 208—111 |
| 3,210,267 | 10/1965 | Plank et al. | 208—120 |
| 3,376,214 | 4/1968 | Bertolacini et al. | 208—89 |
| 3,331,767 | 7/1967 | Arey et al. | 208—111 |
| 3,331,768 | 7/1967 | Mason et al. | 208—111 |
| 3,385,781 | 5/1968 | Hamner et al. | 208—59 |
| 3,516,925 | 6/1970 | Lawrance et al. | 208—111 |
| 3,301,917 | 1/1967 | Wise | 260—683.65 |

FOREIGN PATENTS

| | | | |
|---|---|---|---|
| 3,159,567 | 12/1964 | Young | 208—87 |

DELBERT E. GANTZ, Primary Examiner

G. E. SCHMITKONS, Assistant Examiner

U.S. Cl. X.R.

208—62, 64, 80, 111, 137, 138, 139

UNITED STATES PATENT OFFICE
CERTIFICATE OF CORRECTION

Patent No. 3,707,460  Dated December 26, 1972

Inventor(s) Ralph J. Bertolacini and Richard D. Petersen

It is certified that error appears in the above-identified patent and that said Letters Patent are hereby corrected as shown below:

Column 6, line 49 - "octene" should be --octane--.

Column 7, Table I - last number in column C is "14.5"; should be --14.1--.

Signed and sealed this 10th day of July 1973.

(SEAL)
Attest:

EDWARD M. FLETCHER, JR.　　　　　　　　Rene Tegtmeyer
Attesting Officer　　　　　　　　　　　 Acting Commissioner of Patents